United States Patent
Witte et al.

(10) Patent No.: US 12,240,425 B2
(45) Date of Patent: Mar. 4, 2025

(54) COMPACT ELECTROMECHANICAL BRAKE

(71) Applicant: HITACHI ASTEMO FRANCE, Drancy (FR)

(72) Inventors: Lennart Witte, Strasbourg (FR); Julien Daclat, Lieusaint (FR)

(73) Assignee: HITACHI ASTEMO FRANCE, Drancy (FR)

( * ) Notice: Subject to any disclaimer, the term of this patent is extended or adjusted under 35 U.S.C. 154(b) by 408 days.

(21) Appl. No.: 17/596,165

(22) PCT Filed: Jun. 3, 2020

(86) PCT No.: PCT/FR2020/050950
§ 371 (c)(1),
(2) Date: Dec. 3, 2021

(87) PCT Pub. No.: WO2020/245543
PCT Pub. Date: Dec. 10, 2020

(65) Prior Publication Data
US 2022/0234564 A1    Jul. 28, 2022

(30) Foreign Application Priority Data
Jun. 7, 2019 (FR) ...................................... 1906068

(51) Int. Cl.
*B60T 13/58* (2006.01)
*B60T 1/06* (2006.01)
(Continued)

(52) U.S. Cl.
CPC ............ *B60T 13/588* (2013.01); *B60T 1/067* (2013.01); *B60T 13/746* (2013.01); *F16D 51/22* (2013.01);
(Continued)

(58) Field of Classification Search
None
See application file for complete search history.

(56) References Cited

U.S. PATENT DOCUMENTS

2011/0308898 A1   12/2011   Shiraki
2014/0345989 A1   11/2014   Oshio et al.
(Continued)

FOREIGN PATENT DOCUMENTS

CN          102333970 A       1/2012
DE    102013008673 A1 *   4/2014   ............ B60T 13/588
(Continued)

OTHER PUBLICATIONS

Search Report for French application No. FR1906068 dated Oct. 4, 2019.
(Continued)

*Primary Examiner* — Melanie Torres Williams
(74) *Attorney, Agent, or Firm* — McDonald Hopkins LLC

(57) ABSTRACT

An electromechanical drum brake comprises two brake segments intended to come into contact with a drum, and at least one actuator configured to apply the segments against the drum, and an electric motor configured to activate the actuator, the actuator comprising at least one member which is movable upon activation of the actuator, the movable member being movable between a braking position and a position beyond a release position, in which the segments are no longer in contact with the drum. The actuator comprises a stop which is arranged only in the actuator and against which the movable element bears when it assumes a position beyond the release position, and the motor powers the actuator until the movable element bears against the stop.

6 Claims, 3 Drawing Sheets

(51) Int. Cl.
    *B60T 13/74*     (2006.01)
    *F16D 51/22*     (2006.01)
    *F16D 51/24*     (2006.01)
    *F16D 65/22*     (2006.01)
    *F16D 121/04*     (2012.01)
    *F16D 121/24*     (2012.01)
    *F16D 125/40*     (2012.01)
    *F16D 127/02*     (2012.01)

(52) U.S. Cl.
    CPC ............ *F16D 51/24* (2013.01); *F16D 65/22* (2013.01); *F16D 2121/04* (2013.01); *F16D 2121/24* (2013.01); *F16D 2125/40* (2013.01); *F16D 2127/02* (2013.01); *F16D 2250/0084* (2013.01)

(56) References Cited

U.S. PATENT DOCUMENTS

2017/0261053 A1*   9/2017   Schaefer ............... F16D 55/226
2020/0269824 A1     8/2020   Witte
2021/0001836 A1     1/2021   Witte et al.

FOREIGN PATENT DOCUMENTS

| | | |
|---|---|---|
| JP | 2015004430 A | 1/2015 |
| JP | 2017501357 A | 1/2017 |
| JP | 2017074809 A | 4/2017 |
| WO | 2015101486 A2 | 7/2015 |

OTHER PUBLICATIONS

International Search Report for PCT/FR2020/080950 dated Sep. 22, 2020.
Written Opinion for PCT/FR2020/080950 dated Sep. 22, 2020.
Specification and drawings for U.S. Appl. No. 17/291,453, filed May 5, 2021.
Specification and drawings for U.S. Appl. No. 17/438,765, filed Sep. 13, 2021.
First Office Action in corresponding Chinese Patent Application No. 202080040701.1.
Office action issued on May 7, 2024 in corresponding Japanese Patent Application No. 2021-572423.

* cited by examiner

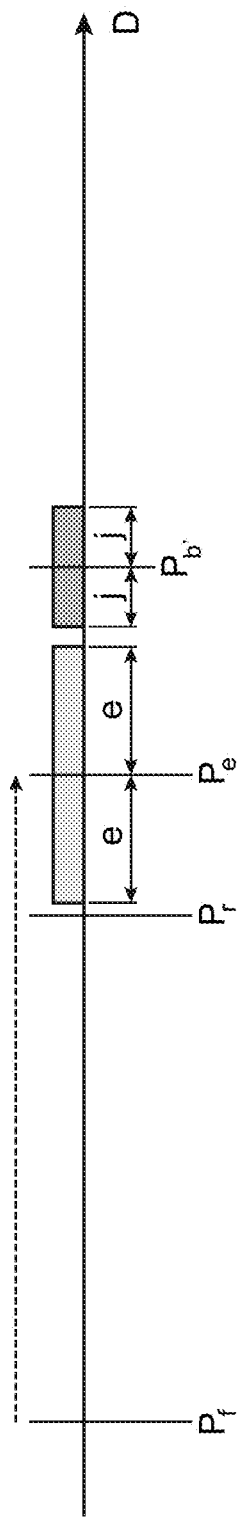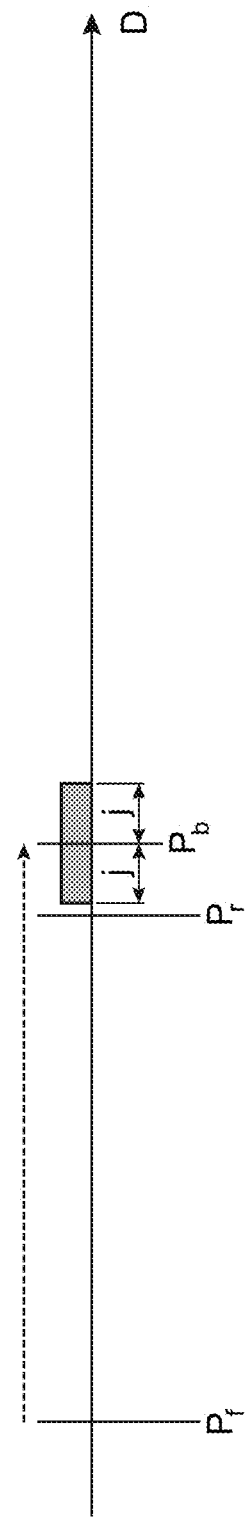

COMPACT ELECTROMECHANICAL BRAKE

CROSS-REFERENCE TO RELATED APPLICATIONS

This is a National Stage of PCT international application PCT/FR2020/050950, filed on Jun. 3, 2020, which claims the priority of French Patent Application No. 1906068, filed Jun. 7, 2019, both of which are incorporated herein by reference in their entirety.

BACKGROUND OF THE INVENTION

The present invention relates to an at least partly electrically actuated automobile vehicle brake providing greater compactness.

In most current automobiles, the service brake is provided by disc brakes and/or drum brakes.

They perform the service braking function, which aims to slow down or even stop the automobile vehicle. The parking brake function aiming to bring a stationary vehicle to a standstill and the emergency brake function are usually achieved with the system providing the parking brake.

The parking brake can be applied by pulling a lever arranged in the passenger compartment which is connected to a mechanism located in a drum brake or disc brake via a brake cable. The mechanism tends to move the braking shoes of the drum brakes apart to apply them against the drums. In the case of a disc brake, the brake pads are clamped to the brake disc.

To improve driver comfort and safety in the application of the parking brake, the car industry has developed an electric parking brake.

For example, an actuator provided with an electric motor is arranged at least on each rear brake, and causes the brakes to be applied.

The driver presses for example a button disposed on the dashboard to activate the electric parking brake.

Electric parking brake systems include DC electric motors, the use of which is recommended by the German Automobile Industry Association in its "VDA Recommendation".

In the case of a disc brake, it is generally the piston that is moved by the actuator and applies the brake pads against the brake disc. In the case of a drum brake, the actuator is for example arranged between the brake shoes and serves as a fixed point when applying service braking via a wheel cylinder. The actuator is, for example, of the screw-nut type and moves the shoes apart.

No sensors are implemented in the actuator to know the relative position of the mechanical elements of the brake. The measurement of current and/or voltage across the electric motor makes it possible to know the state of the applied brake. Indeed, an increase in current and/or voltage corresponds to an applied state of the parking brake.

Furthermore, it is currently desired that none of the components contacts a mechanical stop during the release stroke to avoid damaging the brake, for example, it is desired that the piston does not abut against the bottom of the caliper.

The relative position of the mechanical elements of the brake during the application of parking braking is currently obtained by means of an estimation by knowing the applied position given by the value of current and/or voltage across the motor and, for example, by counting the number of revolutions of the nut of the actuator. However, the estimation of the relative position of the mechanical elements of the brake at the end of the brake release phase is not very accurate. In order to take this inaccuracy into account and to prevent the brake components from abutting, an error margin is allowed around the estimated position. Furthermore, an additional safety margin is taken to account for dimensional inaccuracies inherent to the brake manufacture. As a result, the dimensioning of the brake incorporates these error and safety margins. The brake then has a certain overall size. Furthermore, due to the inaccuracy in the position of the components in the released state, the starting position for the next braking operation is not known. In addition, the stroke to be covered by the component(s) is lengthened which increases the brake application time, and also the time during which the actuator emits noise.

Document US2014/0345989 describes a drum brake including an electric actuator for the parking brake implementing a lever. Thereby, It has a large overall size.

DISCLOSURE OF THE INVENTION

It is therefore a purpose of the present invention to provide an at least partly electrically actuated automobile vehicle brake which is compact and provides greater control accuracy.

The aforementioned purpose is achieved by an automobile vehicle brake including at least one electric actuator for moving one or more elements of the brake so as to apply a braking force to an element rotatably integral with a wheel, said actuator including at least one mechanical stop, said actuator being controlled in the brake release phase so that at least one of the movable elements of the actuator bears against the stop. As the position of the stop is known to within the manufacturing clearance, the position of said at least one element is known with increased accuracy. It is then possible to dimension the brake as accurately as possible, i.e. without taking account of a margin due to the inaccuracy in the estimation of the retracted position. The stroke to be travelled in order to apply the brake is then reduced, and the brake application time is shorter. The time during which the actuator emits noise is actually also reduced, as well as the duration of discomfort to the driver and passengers of the vehicle.

In other words, an actuator is made in which the position of at least one movable element is voluntarily set to a rest state of the brake, so as to reduce uncertainties about its position, and thus have greater freedom in choosing dimensions of the actuator, for example so as to make it more compact.

In one example, the brake includes an electric actuator for applying the parking brake and a hydraulic actuator providing the service brake function.

In another example, the brake is entirely electrically actuated, with the actuator providing both parking and service braking.

In one example, the actuator is of the screw-nut type and the stop means include a tooth on the thread forming a stop for the nut. In another example, the actuator includes elastically deformable means capable of storing energy, the stop means forming a stop for at least part of the elastically deformable means.

One object of the present invention is then an electromechanical brake including at least one frictional member for contacting a friction part rotatably integral with the wheel and at least one actuator configured to apply said frictional member against said friction part, and an electric motor configured to activate said actuator, said actuator including at least one movable element upon activating the actuator, said movable element being movable between a braking position, in which the frictional member is in contact with the friction part, and a position beyond a release position, in which said frictional member is no longer in contact with the friction part. The actuator includes stop means arranged so that said movable element bears against said stop means, when it assumes a position beyond the release position, and the electric motor is controlled, in the brake release phase, to activate the actuator until the movable element bears against the stop means.

Preferably, the electromechanical brake includes a control unit including means for controlling the power supply to the electric motor and means for measuring the electric consumption of the electric motor, said control means being configured to stop power supply to the electric motor, when the electric consumption exceeds a given value.

Advantageously, the actuator is configured to apply at least parking braking and wherein the brake includes a second actuator for applying service braking.

For example, the brake is a drum brake including a drum, a backing plate, two shoes, the actuator being attached to the backing plate.

In one advantageous example, the actuator includes a screw-nut assembly, said nut forming said movable element, said screw including a head and a rod provided with a screw pitch, said head forming a piston bearing against one of the brake shoes, and the stop means include a tooth protruding from said thread arranged to contact the nut when it assumes a position beyond the release position.

For example, the actuator may include a body, elastically deformable means able to store energy upon applying activation of the actuator, at least part of said deformable means forming the movable element, and the body may include the stop means.

It is also an object of the present invention to provide a method for manufacturing an electromechanical brake according to the present invention, including:
  determining the position of the at least one movable element beyond which the brake is released,
  b) determining the position of the stop means relative to said release position so that the stop means are spaced from the release position by at least one manufacturing clearance associated with said method,
  c) making the stop means in the actuator in the position determined in step b),
  d) assembling the actuator and the frictional member.

BRIEF DESCRIPTION OF THE DRAWINGS

The present invention will be better understood based on the following description and the appended drawings in which:

FIG. 1 is a schematic representation of the estimated movement of a movable element of an actuator of an electromechanical brake of the state of the art.

FIG. 2 is a schematic representation of the estimated movement of a movable element of an actuator of an electromechanical brake according to the invention.

DETAILED DISCLOSURE OF PARTICULAR EMBODIMENTS

Figure 3:
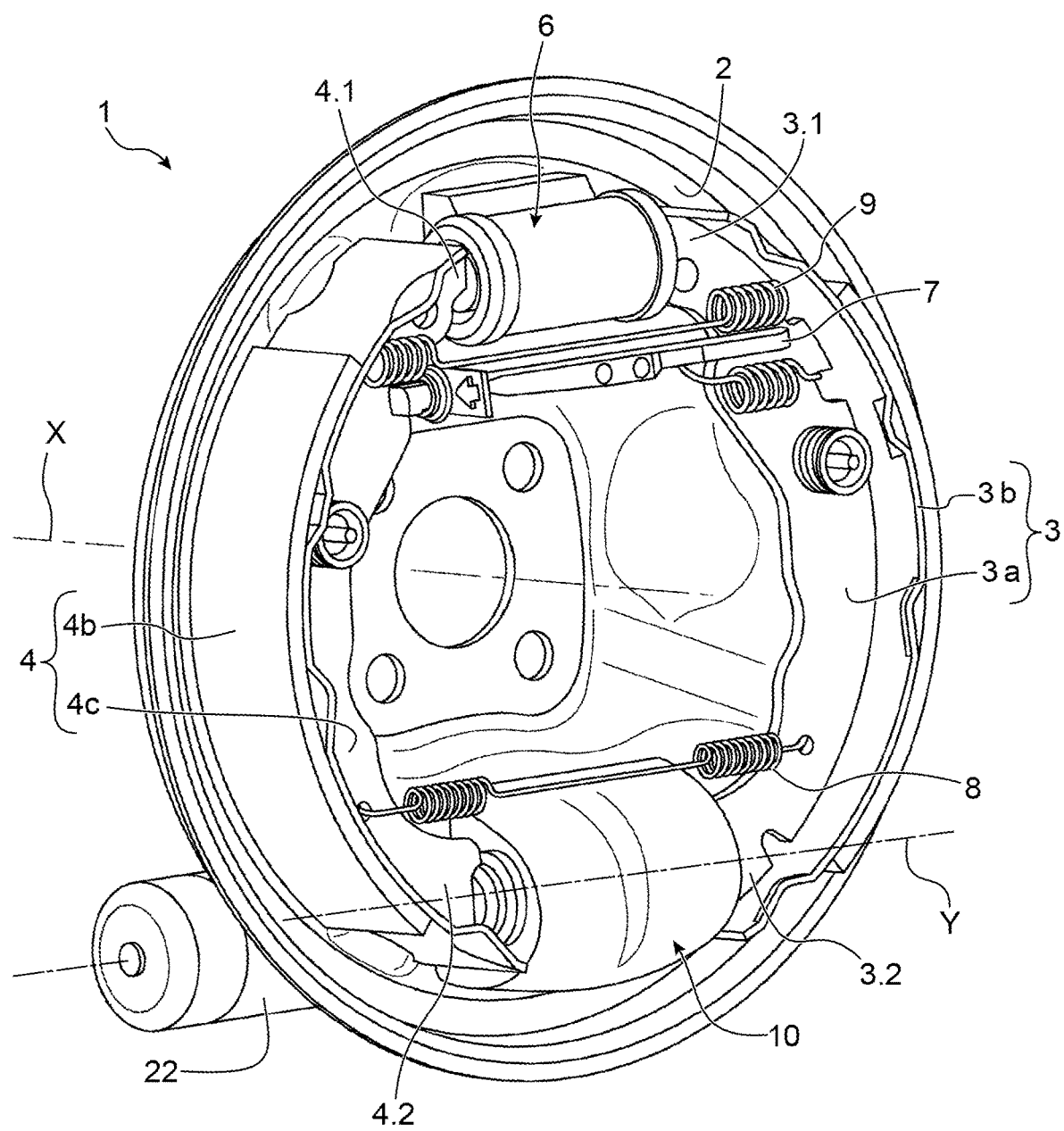
FIG. 3 is a perspective view of an example of an electric parking brake drum brake according to the invention.

In FIG. 3, a "dual mode" drum brake 2 in an exemplary embodiment of the invention can be seen.

The drum brake 1 includes a drum (not represented) movably integral with the wheel (not represented), an X-axis revolving backing plate 2 fitted with a first and a second arc-of-circle shoes 3 and 4, the shoes being radially movable so that they can be pressed against the cylindrical inner face of a drum not represented.

The shoes 3 and 4 each include a web 3a, 4a made of flat sheet in the form of a portion of a circular crown which carries a brake lining 3b, 4b, and are mounted diametrically opposite each other with their ends bearing on both a hydraulic wheel cylinder 6 and a mechanical actuator 10 carried by the backing plate 2. These shoes 3 and 4 are further biased towards each other by two return springs 8 and 9, and each pressed against the backing plate 2 by a so-called side spring.

A wear adjustment connecting rod 7 extends along the wheel cylinder 6, having a first end bearing on the web 3a of the first shoe 3 and a second end bearing on the web 4a of the second shoe 4 when the brake is at rest.

The wheel cylinder 6 is for being actuated when the drum brake 1 is used according to a first so-called "simplex" operating mode, which ensures progressive braking particularly adapted to brake the vehicle in service. It comprises a hydraulic chamber closed at its ends by two pistons which move away from each other when the hydraulic pressure increases and pushes the associated ends of the shoes 3 and 4.

The mechanical actuator 10, in turn, ensures parking and emergency braking by moving the associated ends of the shoes apart to ensure rapid and powerful locking of the vehicle wheels according to a so-called "duo-servo" operating mode, especially when the wheel cylinder 6 is inactive. This actuator is driven by an electric motor 22. In the example represented, the wheel cylinder includes two opposite pistons, each of which actuates one of the shoes 3, 4 by spacing apart their two ends 3.1, 4.1 facing from each other, that is those located on the same side of the axis of rotation X, here referred to as the "movable ends" and located at the top of FIG. 3. At its opposite end 32, 4.2, called the stop end, each shoe bears on the backing plate 2 by an anchoring element integral with the backing plate, thus forming a stop for this shoe. The anchoring element transmits at least part of the braking torque between the shoes and backing plate. The anchoring element of both shoes is formed by the actuator 10.

The actuator 10 extends along an axis Y perpendicular to the axis X of the backing plate and parallel to the backing plate. It includes a casing 12 which is attached to the backing plate 2 on the side of the first face. The casing includes a housing formed by a through bore 13 extending along the axis Y and opening at both longitudinal ends of the casing 12. A drive assembly is housed in the bore 13.

The drive assembly is, for example, of the screw-nut type, such as that described in application WO2015/101486. It includes two bearing elements 16, 20 for forming a fixed point for the ends 3.2, 4.2 of the brake shoes 3, 4 respectively in service braking, and applying a force on the ends 3.2, 4.2 in parking braking by being moved towards outwardly of the casing along the axis Y.

The drum brake also includes a drive device 22 for the actuator, attached to the other face side of the backing plate opposite the face to the side of which the actuator 10 is mounted.

The drive device is an electric motor which may or may not be associated with a motor reducer.

A passageway (not illustrated) is provided through the backing plate 2 to allow drive transmission from the drive device to the drive assembly of the actuator 10.

Figure 4:
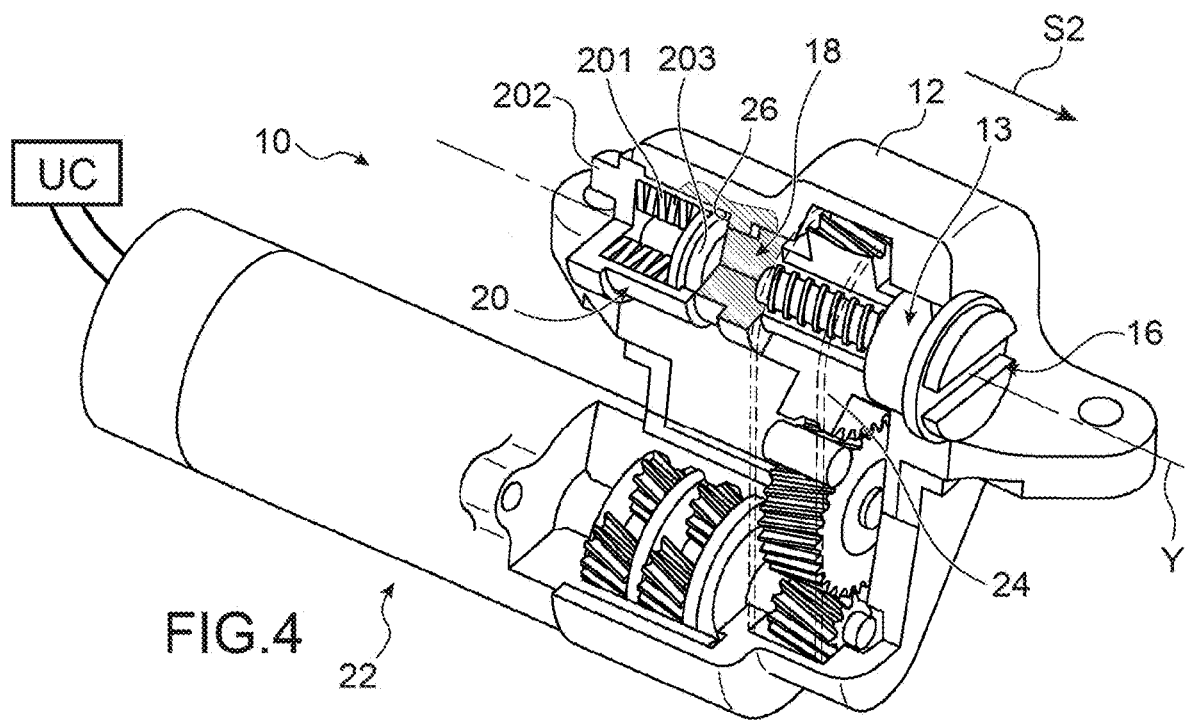
FIG. 4 is a partially cut-away perspective view of an example actuator for a drum brake according to the invention.

In FIG. 4, an example drum brake actuator 10 according to the invention can be seen. It includes a first threaded element 16 and a second element 18 having an internal thread receiving the first threaded element 16, the first and second elements interacting with each other to form a screw-nut system. This screw-nut system produces the linear movement under the effect of a rotation of the second element 18 relative to the first element 16. It transforms torque received by the second element 18 into two opposite axial forces on each of the elements 16, 18 respectively.

The first element 16 forms a piston bearing against the brake shoe 3 and a second piston 20 is interposed between the brake shoe 4 and the second element 18. The second element 18 is to be rotatably driven by a toothed wheel 24 rotated by the drive device. In the example represented, the first element 18 is mounted in the toothed wheel 24 and is rotatably secured relative thereto by means of splines.

In this embodiment, the thread angle of this screw-nut system is chosen so that the force transmission obtained is irreversible, by choosing a thread angle which is less than the friction angle of the pair of materials used to make these two elements.

This choice of a screw-nut system, combined with the choice of such a thread angle, produces an irreversibility that provides the locking function in the parking braking position. That is, a force received by the pistons 16, 20 from the shoes 3, 4 is blocked by the non-slip between the threads of both elements of the screw-nut system. It is thus not transmitted to the motor system, making it unnecessary to block the motor or to keep it under load.

Further, as is visible in FIG. 4, the actuator 10 also includes an elastically deformable element along the axis of the actuation motion, so-called elastic element or also spring pack, to provide the function of force stabilisation in the bearing chain. In this exemplary embodiment, this elastic element is made by one of both pistons, in this case the second piston 20. Depending on the forces transmitted in the direction of movement of the spreader, this elastic element has a determined spring constant to provide a stroke allowing to maintain or restore sufficient bearing of the shoes against the drum under different circumstances or changes of situation.

Alternatively, the spring pack is arranged between the second piston 20 and the second element 18.

In particular, this elastic element is thus likely to store, by compression in the actuation assembly upon activating the actuator while the device is in the first braking position, a sufficient quantity of mechanical energy to maintain or bring the device into the second braking position if bearing of the wheel cylinder 6 is interrupted after activation of the actuator 10 without the need to activate the actuator again.

Such a situation occurs, for example, when the driver stops the vehicle and holds it stationary using the service brake, and then engages the parking brake before releasing the service brake control, for example when stopping to park on a slope. This elastic reserve compensates for the strokes required to move from one braking position to another, for example from simplex to duo-servo mode, while providing sufficient load to meet the needs for bringing the vehicle to a standstill.

The stroke of this elastic element also makes it possible, during a variation in the dimensions of elements 3, 4 of the drum brake, and without activation of the actuator 10:
- to maintain the bearing force of the shoes 3, 4 against the friction track in the case of dimensional variations in one direction, for example in the case of thermal shrinkage of the shoes or of the elements of the mechanical chain creating this bearing, such as the pistons or the mechanism which moves them apart, or for example in the case of thermal expansion of the drum; and
- to limit the increase in forces in the mechanism in the case of dimensional variations in the other direction, which may be caused, for example, by thermal shrinkage of the drum when it cools down when stationary after having been heated as a service brake during a journey.

This elastic element thus makes it possible to limit and most often avoid any need for automatic reactivation of the system during parking, also called "re-clamping", which can be energy consuming and subject to malfunctions that may have serious consequences.

In embodiments where motion of the actuator is achieved by an irreversible type mechanism, the elastic element is located downstream of the irreversible mechanism.

In the example in FIG. 4, the elastic element is here provided by the second piston 20 which comprises a piston head 202 having rearwardly a skirt within which a piston bottom 203 can slide. The piston head 202 and the piston bottom 203 bear against each other by means of a compressible elastic structure 201, in this case an advantageously pre-stressed stack of conical steel washers, known as "Belleville" washers. The assembly is held together by crimping the end of the skirt around the rear of the piston bottom 203.

According to the invention, the drum brake includes means 26 forming a stop for at least one of the movable elements of the actuator 10, during the parking brake release phase.

The movable element has a release position Pr from which, in the brake release phase, it is certain that the parking brake has been released. The means 26 are arranged in the actuator in a position Pb beyond the release position Pr in the release phase.

The term "movable elements of the actuator" refers to the elements of the actuator that are moved upon applying the parking brake and releasing the same.

According to a first example, the stop means are arranged between the spring pack and the body of the actuator 10.

When the actuator is activated to release the parking brake, the second element 18 slides along the axis Y of the actuator towards the first piston 16, the second piston 20 moves in the direction S2 under the action of the shoe 4 which is brought back inwardly by the return spring 8. Further, the spring pack relaxes, causing the piston bottom 203 of the piston 20 to move in direction S2. The actuator is in a state where the brake is released, the bottom 203 of the second piston 20 is in the position Pr. The bottom 203 continues to move to bear against an axial stop and reach the rest position Pb. The position Pb of the stop 26 is such that the bottom 203 bears against it, when the spring pack is completely released. In the example represented, the stop 26 is a shoulder formed in the bore 13 of the actuator casing 12. The end of the second element 18 for contacting the second piston 20 slides in a reduced diameter portion of the bore 13.

The position Pb of the bottom 203 is then still the same at each release of the parking brake. This position is known to within the manufacturing clearance.

Consequently, at the beginning of each activation of the parking brake, the position of the second piston 20 is known to within the manufacturing clearance. Its position, upon activating the actuator 10, can then be estimated relatively accurately by counting the number of revolutions of the second element 18 which is known from the number of revolutions of the motor and the reduction ratio between the motor and the second element 18. The estimation uncertainty due to the uncertainty of the position of one of the actuator elements in the rest state is eliminated. The position Pb is downstream of the position Pr in the direction of movement of the movable element in the brake release phase.

Figure 5:
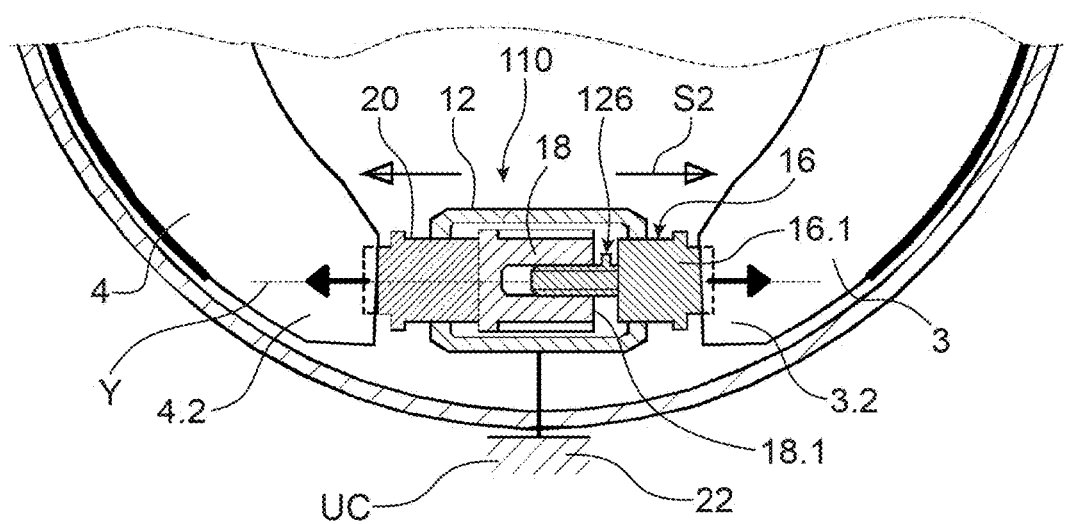
FIG. 5 is a schematic cross-section view of another example actuator for a drum brake according to the invention.

In another exemplary embodiment represented in FIG. 5, the actuator 110 includes stop means formed by a tooth 126 on the thread of the first piston 16 against which the longitudinal end 18.1 of the second element 18, oriented on the side of the first piston 16, bears when the actuator is in the released position. The tooth 126 is schematically represented in FIG. 5.

The operation of the brake according to the invention will now be described from the example of FIG. 5 and with the schematic representation of the movement D of the second element 18 in FIG. 2.

The positions in FIG. 2 are the positions of the longitudinal end 18.1 of the second element 18 for contacting the tooth 126.

It is considered that the parking brake is applied (FIG. 5). The first element is in the position Ps. The pistons 16 and 20 are moved away from each other and apply the brake shoes against the drum. The longitudinal end 18.1 of the second element 18 is in the position Pf, when the parking brake is applied.

If the driver decides to deactivate the parking brake, he or she controls the activation of the actuator 10, for example by pressing a button, the second element 18 is rotated via the electric motor and the toothed wheel, so that the pistons 16 and 20 slide towards each other. The second piston 16, in particular its threaded rod, slides in the second element 18, the piston head 16.1 moving closer to the longitudinal end 18.1 of the second element. The second element 18 turns until the pistons 16, 20 have travelled a stroke towards each other which is considered sufficient to ensure the parking brake release, the longitudinal end 18.1 of the second element 18 then has the position Pr. The second element 18 is then turned until the tooth 126 bears against the longitudinal end 18.1 of the second element, the longitudinal end 18.1 of the second element 18 is in the position Pb. A control unit UC then measures an increase in the current across the motor, and controls the power supply to the motor to be stopped. The actuator is stopped.

The position of the tooth 126 is advantageously chosen so that the contact between the tooth and the second element 18 takes place just after the release stroke has been travelled in order to obtain a very compact brake.

Thus, when designing the brake, in particular the actuator, the axial dimension of the actuator is chosen so that the second element 18 can travel the distance between Pr and Pb. As the position Pb is known to within the manufacturing clearance, the length of the actuator can be optimised and there is no need to provide an additional margin to take account of the uncertainty of the position of the second element in the released position. The distance between Pb and Pr is at least equal to the manufacturing clearance. In FIG. 2, this distance is slightly greater than the clearance j.

In FIG. 1, the movement of the second element 18 in an actuator of the state of the art can be seen. A rest position assumed by the second element is an estimated position Pe, which is estimated with an error margin e. Dimensioning of the actuator takes account of the error margin e and the manufacturing clearance j for the position Pb' of the stop. Considering an actuator of the type shown in FIG. 5, the length of the actuator of the state of the art is at least 2e greater than that of the actuator according to the invention in FIG. 5.

By virtue of the invention, a reduction of 2 mm in the length of the actuator can be achieved.

Further, by optimising the stroke of the first element, i.e. by reducing it, the application of the parking brake during the next activation of the parking brake will be faster, as the first element has a shorter distance to travel.

According to another exemplary embodiment, a stop is provided on the body of the actuator against which the first element 18 bears in the stop position.

The present invention is also applicable to an electromechanical disc brake.

The present invention applies to floating caliper disc brakes and fixed caliper disc brakes.

In the examples described, the movable element(s) of the actuator move along an axis and possibly rotate about that axis. In another example, the actuator has at least one part that is only rotatably movable, for example of the cam type, the stop forming an angular stop. The stop means interrupt a rotational motion only.

In the example of FIG. 4, the stop means form an axial stop for the spring pack. In the example shown in FIG. 5, the stop means form a rotational stop and interrupt a translational movement. Further alternatively, the stop means form an axial stop for an element that is both rotatably and translationally movable.

An exemplary method for making the brake shown in FIG. 5 will now be described.

Firstly, the minimum movement of the movable element(s) of the actuator is determined to make sure that the brakes are released. From this minimum movement, the position that the movable element(s) have to reach in the release phase, for the brake to be released, is determined. This position is the position Pr in FIG. 2.

The position of the stop Pb is then determined relative to the position Pr, taking account of the manufacturing clearance j. The minimum distance between Pr and Pb is at least equal to j.

The stop means are made on the body of the actuator or another part of the actuator, so that the movable part contacts the stop in the position Pb, i.e. Pr+j. The various parts of the actuator are adapted to this movement, especially the casing which has a greater compactness.

In the case of a movable element having a rotational movement only, the movement is an angular movement.

The present invention applies to all electromechanical brakes that are partly or entirely electrically actuated. It applies to brakes in which parking and/or service braking is achieved by electrical actuation. In the case of an electromechanical brake, in which service braking is provided by an electrical actuator, contact between at least one movable element of the actuator and the stop means takes place at each complete release of the service braking.

REFERENCES 1 drum brake
2 backing plate 3 first shoe
4 second shoe
3a, 4a webs
3b, 4b brake linings
6 hydraulic wheel cylinder
7 wear adjustment connecting rod
8, 9 return springs
10 mechanical actuator
12 actuator casing
13 actuator bore
16 first element/first piston
16.1 head of the second piston
18 second element
18.1 longitudinal end of second element
20 second piston
22 electric motor
24 toothed wheel
26/126 stop means
201 spring pack
202 head of the second piston
203 top of the second piston
X, Y axes
e error margin
j manufacturing clearance
Pb, Pb' stop position
Pf braking position
Pr release position
UC Control unit

What is claimed is:

1. An electromechanical brake comprising:
at least one frictional member for contacting a friction part rotatably integral with the wheel,
at least one actuator configured to apply said frictional member against said friction part, and
an electric motor configured to activate said actuator,
said actuator including a screw-nut assembly and at least one movable element upon activating the actuator, said movable element being movable between a braking position, in which the frictional member is in contact with the friction part, and a position beyond a release position, in which said frictional member is no longer in contact with the friction part,
wherein said actuator includes stop means arranged only in the actuator and such that said movable element bears against said stop means, when it assumes a position beyond the release position, and wherein the electric motor is controlled, in the brake release phase, to activate the actuator until the movable element bears against the stop means,
wherein the brake is a drum brake including a drum, a backing plate, and two brake shoes, wherein the actuator is attached to the backing plate, and
wherein the actuator further includes two pistons, wherein each piston is configured to bear against a brake shoe.

2. The electromechanical brake according to claim 1, including:
a control unit including means for controlling power supply to the electric motor and means for measuring electric consumption of the electric motor,
said control means being configured to stop power supply to the electric motor, when the electric consumption exceeds a given value.

3. The electromechanical brake according to claim 1, wherein the actuator is configured to apply at least parking braking and wherein the brake includes a second actuator for applying service braking.

4. The electromechanical brake according to claim 1, wherein said nut forms said movable element and wherein said screw comprises a head and a rod provided with a screw pitch, said head forming a piston bearing against one of the brake shoes, and wherein the stop means include a tooth protruding from said thread arranged to contact the nut when it assumes a position beyond the release position.

5. The electromechanical brake according to claim 1, wherein the actuator includes a body, elastically deformable means able to store energy upon applying activation of the actuator, wherein at least part of said deformable means forms the movable element, and wherein the body includes the stop means.

6. A manufacturing method for manufacturing an electromechanical brake, wherein the electromechanical brake includes:
at least one frictional member for contacting a friction part rotatably integral with the wheel and
at least one actuator configured to apply said frictional member against said friction part, and
an electric motor configured to activate said actuator,
said actuator including at least one movable element upon activating the actuator, said movable element being movable between a braking position, in which the frictional member is in contact with the friction part, and a position beyond a release position, in which said frictional member is no longer in contact with the friction part,
wherein said actuator includes stop means arranged only in the actuator and such that said movable element bears against said stop means, when it assumes a position beyond the release position, and wherein the electric motor is controlled, in the brake release phase, to activate the actuator until the movable element bears against the stop means
wherein the manufacturing method includes the following steps:
a) determining the position of the at least one movable element beyond which the brake is released,
b) determining the position of the stop means relative to said release position such that the stop means are spaced from the release position by at least one manufacturing clearance associated with said method,
c) making the stop means in the actuator in the position determined in step b), and
d) assembling the actuator and the frictional member.

* * * * *